United States Patent
Moazami

(10) Patent No.: US 10,623,204 B2
(45) Date of Patent: Apr. 14, 2020

(54) CONTROLLING A DISTRIBUTED SYSTEM

(71) Applicant: Syyed Gholam Reza Moazami, Mashhad (IR)

(72) Inventor: Syyed Gholam Reza Moazami, Mashhad (IR)

( * ) Notice: Subject to any disclaimer, the term of this patent is extended or adjusted under 35 U.S.C. 154(b) by 9 days.

(21) Appl. No.: 16/005,318

(22) Filed: Jun. 11, 2018

(65) Prior Publication Data
US 2019/0116060 A1  Apr. 18, 2019

Related U.S. Application Data

(60) Provisional application No. 62/517,929, filed on Jun. 11, 2017.

(51) Int. Cl.
*H04L 12/801* (2013.01)
*H04L 12/43* (2006.01)
(Continued)

(52) U.S. Cl.
CPC .............. *H04L 12/43* (2013.01); *G05B 15/02* (2013.01); *H04L 12/00* (2013.01); *H04L 12/46* (2013.01);
(Continued)

(58) Field of Classification Search
CPC ............... H04L 12/40; H04L 12/40013; H04L 12/40026; H04L 12/40019;
(Continued)

(56) References Cited

U.S. PATENT DOCUMENTS 6,178,475 B1 *  1/2001  O'Brien .............. G06F 13/3625
                                                            710/116
6,389,029 B1     5/2002  McAlear
(Continued)

OTHER PUBLICATIONS

Khemaissia et al. "New multi-token based protocol for flexible Networked microcontrollers." In Software Engineering and Applications (ICSOFT-EA), 2014 9th International Conference on, pp. 464-469. IEEE, 2014.
(Continued)

*Primary Examiner* — Jae Y Lee
*Assistant Examiner* — Aixa A Guadalupe Cruz
(74) *Attorney, Agent, or Firm* — Bajwa IP Law Firm; Haris Zaheer Bajwa

(57) ABSTRACT

A method for controlling a distributed system. The distributed system includes a plurality of nodes and a bus. The plurality of nodes is associated with a plurality of timers. The method includes assigning a plurality of timer values including a first timer value and a second timer value to the plurality of timers in response to no data being loaded on the bus, defining an initial timer value equal to the first timer value, counting down the plurality of timer values with a given rate by activating the plurality of timers, stopping counting down the plurality of timer values in response to the first timer value reaching zero by stopping the plurality of timers, replacing the first timer value with a reference value, and sending data from the first node to the bus. The first timer value is assigned to a first timer of the plurality of timers, and the second timer value is assigned to a second timer of the plurality of timers. The first timer is associated with a first node of the plurality of nodes and the second timer is associated with a second node of the plurality of nodes. The first timer value is the smallest timer value among the plurality of timer values, and the second timer value is the largest timer value among the plurality of timer values. The reference value is smaller than the initial timer value and is larger than the second timer value.

18 Claims, 7 Drawing Sheets

(51) Int. Cl.
  *H04L 12/46* (2006.01)
  *H04L 12/00* (2006.01)
  *G05B 15/02* (2006.01)

(52) U.S. Cl.
  CPC .......... *H04L 12/4625* (2013.01); *H04L 47/12* (2013.01); *H04L 47/13* (2013.01)

(58) Field of Classification Search
  CPC ... H04L 12/40006; H04L 47/10; H04L 47/13; H04L 12/43; H04L 47/12; H04L 12/40084; H04L 12/4013; H04L 12/413; H04L 12/417
  See application file for complete search history.

(56) References Cited

U.S. PATENT DOCUMENTS

| | | | |
|---|---|---|---|
| 6,480,473 B1 * | 11/2002 | Chambers | H04L 41/00 370/253 |
| 6,968,905 B2 | 11/2005 | Adnan et al. | |
| 8,274,920 B2 | 9/2012 | Carter | |
| 8,687,647 B2 | 4/2014 | Nakamura | |
| 9,264,363 B2 | 2/2016 | Jiang | |
| 2016/0062350 A1 | 3/2016 | Prall et al. | |
| 2017/0048081 A1 | 2/2017 | Maitland | |

OTHER PUBLICATIONS

Ibrahim. "Using Ethernet in embedded applications." Electronics World 117, No. 1899 (2011): 20-25.

Bolic et al. "Distributed measurement and control system based on microcontrollers with automatic program generation." Sensors and Actuators A: Physical 90, No. 3 (2001): 215-221.

Mathew et al. "Wireless industrial automtion using arduina" International Journal of Advanced Research in Electrical, Electronics and Instrumentation Engineering, vol. 5, pp. 2640-2644, 2016.

Joshi et al. "Performance Analysis and Comparison of Multi Hop Token Ring and Token Bus LAN Technologies." International Journal of Computer Applications 148, No. 5 (2016).

Firmansyah et al. "Microcontroller based distributed and networked control system for public cluster." arXiv preprint arXiv:0906.0281(2009).

* cited by examiner

CONTROLLING A DISTRIBUTED SYSTEM

CROSS-REFERENCE TO RELATED APPLICATION

This application claims the benefit of priority from U.S. Provisional Patent Application Ser. No. 62/517,929, filed on Jun. 11, 2017, and entitled "DESIGN AND MANUFACTURE OF LOCAL NETWORK BASED CONTROLLERS FOR A DISTRIBUTED AUTOMATION NETWORK USING STM MICROCONTROLLERS," which is incorporated herein by reference in its entirety.

TECHNICAL FIELD

The present disclosure generally relates to control systems, and particularly, to distributed control systems.

BACKGROUND

The development of industrial control systems has led to products quality enhancement and manufacturing expense cut back. Rapid development of electronic controllers and devices in the previous century resulted in the emergence of direct digital control (DDC) systems. However, these systems may suffer from input limitation, computer efficacy and speed shrinkage with regard to great information volume and control system stopping as a result of central computer failures.

Distributed control systems (DSCs) may be reasonable replacements of DDCs for automation industry optimization. However, these systems may require more advanced control mechanisms. Major control methods for DSCs may include central control methods, such as circuit switching protocols, polling and time-division multiple access (TDMA), random controlling, and distributed control methods, such as token ring and token bus protocols. However, these methods may suffer from certain failures, such as absence of certainty and disciplined process for channel accessing, low level efficiency for high loads due to collision enhancement, and channel efficiency decrease at high speeds.

There is, therefore, a need for a more efficient control method in distributed systems for enhanced data transfer in terms of certainty and speed. There is also a need for a method for reducing the collision probability in distributed systems.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes a method for controlling a distributed system. The distributed system may include a plurality of nodes and a bus. The plurality of nodes may be associated with a plurality of timers. The method may include assigning a plurality of timer values including a first timer value and a second timer value to the plurality of timers in response to no data being loaded on the bus, defining an initial timer value equal to the first timer value, counting down the plurality of timer values with a given rate by activating the plurality of timers, stopping counting down the plurality of timer values in response to the first timer value reaching zero by stopping the plurality of timers, replacing the first timer value with a reference value, and sending data from the first node to the bus. The first timer value may be assigned to a first timer of the plurality of timers, and the second timer value may be assigned to a second timer of the plurality of timers. The first timer may be associated with a first node of the plurality of nodes and the second timer may be associated with a second node of the plurality of nodes. The first timer value may be the smallest timer value among the plurality of timer values, and the second timer value may be the largest timer value among the plurality of timer values. The reference value may be smaller than the initial timer value and may be larger than the second timer value.

The above general aspect may include one or more of the following features. In some implementations, the method may further include repeating an iterative process. The iterative process may include counting down the plurality of timer values with the given rate by activating the plurality of timers in response to no data being loaded on the bus, stopping counting down the plurality of timer values by stopping the plurality of timers in response to any of the plurality of timer values reaching zero, selecting a third timer value of the plurality of timer values, replacing the third timer value with the reference value, and sending data from a third node of the plurality of nodes to the bus. In an implementation, the third timer value may be equal to zero, and may be associated with a third timer of the plurality of timers. The third timer may be associated with the third node.

In some implementations, the method may further include sending a $j^{th}$ token of a plurality of tokens from an $i^{th}$ node of the plurality of nodes to a $j^{th}$ node of the plurality of nodes, and sending data from the $j^{th}$ node to the bus in response to the $j^{th}$ node being active.

Other systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the claims herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
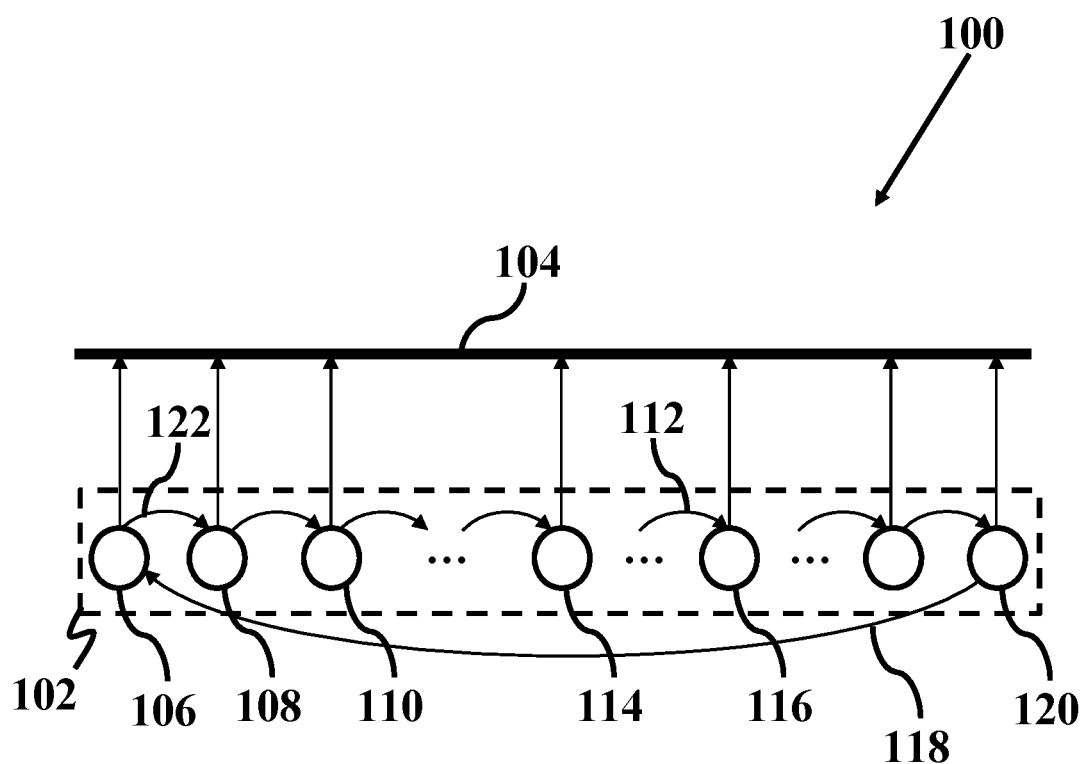
FIG. 1 is a schematic representing a distributed system according to one implementation of the present disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein is disclosed a novel method for controlling a distributed system. The method controls data transfer from nodes to a bus in the distributed system. When the system is activated, a time is assigned for each of the nodes of the distributed system. Each time (i.e., timer value) is loaded into a timer that is associated with a separate node. The timers are then activated and start counting down until a first timer reaches zero. The timers then stop counting down and a node that corresponds to the first timer sends its data to the bus.

In some implementations, the method continues via an iterative process. At each step of the iterative process, a reference value is assigned to the timer that has reached zero (i.e., the first timer at the first step). The reference value is chosen smaller than the largest timer value at the activation moment of the distributed system, and larger than the smallest timer value at the moment that the counting down process is stopped. The timers then continue counting down until another timer reaches zero. Consequently, a corresponding node sends data to the bus, and the iterative process is repeated.

In other implementations, after the first node sends data to the bus, it sends a token to a second node. If the second node is active, it sends its data the bus and sends another token to a next node until all nodes of the distributed system receive their tokens and send data to the bus. The process is then repeated from the first node. If a destination node does not acknowledge receiving its token from a source node (i.e., the node is not active), the source node sends another token to a next node and this cycle is repeated until reaching an active node.

FIG. 1 is a schematic representing a distributed system 100 according to one implementation of the present disclosure. The distributed system 100 may include a plurality of nodes 102 and a bus 104. The plurality of nodes 102 may include a first node 106, a second node 108, and a third node 110. In some implementations, the plurality of nodes associated with a plurality of timers. In an implementation, each of the plurality of nodes may include an active electronic device connected to the distributed system 100 which may be capable of forwarding, receiving or resending data on the bus 104.

Figure 2:
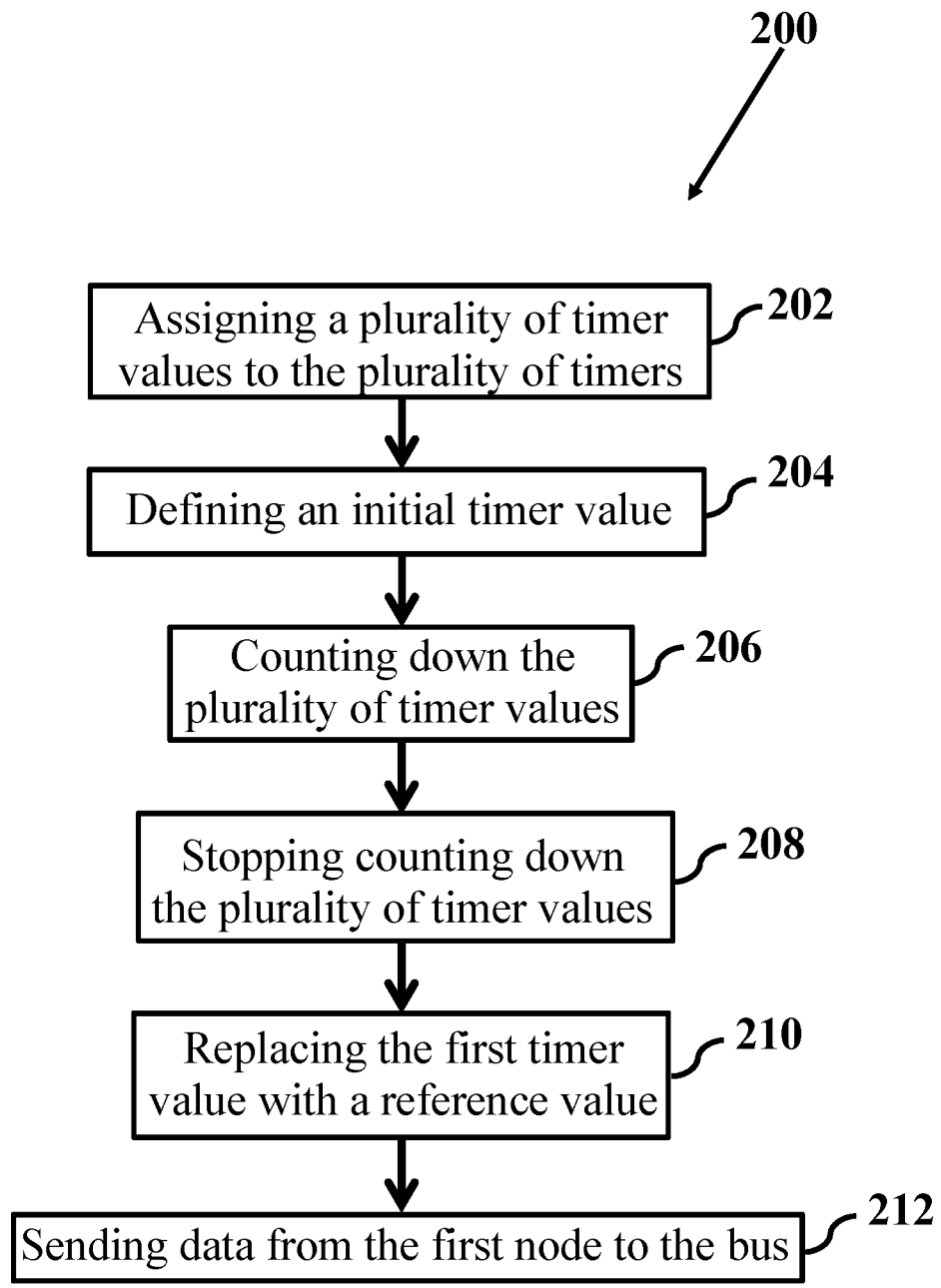
FIG. 2 is a flowchart of a method for controlling a distributed system according to one implementation of the present disclosure.

FIG. 2 is a flowchart of a method 200 for controlling the distributed system 100 according to one implementation of the present disclosure. In some implementations, the method 200 may include assigning a plurality of timer values to the plurality of timers in response to no data being loaded on the bus 104 (a first step 202), defining an initial timer value (a second step 204), counting down the plurality of timer values with a given rate by activating the plurality of timers (a third step 206), stopping counting down the plurality of timer values in response to the first timer value reaching zero by stopping the plurality of timers (a fourth step 208), replacing the first timer value with a reference value (a fifth step 210), and sending data from the first node 106 to the bus 104 (a sixth step 212). In different implementations, each of the plurality of timer values may be stored in a data buffer. In some implementations, the plurality of timer values may include a first timer value a and a second timer value b. The first timer value a may be assigned to a first timer of the plurality of timers prior to counting down the plurality of timers (i.e., the third step 206), and the second timer value b may be assigned to a second timer of the plurality of timers prior to counting down the plurality of timers (i.e., the third step 206). In some examples, the first timer may be associated with the first node 106 and the second timer may be associated with the second node 108 of the plurality of nodes. The first timer value a may be the smallest timer value among the plurality of timer values, and the second timer value b may be the largest timer value among the plurality of timer values. In some implementations, the first timer value a and the second timer value b may satisfy a condition according to b<2a. In other words, in some implementations, the largest timer value may be set smaller than twice the smallest timer value. In other implementations, the initial timer value may be equal to the first timer value a prior to counting down the plurality of timer values (i.e., third step 206). In different implementations, the reference value may be smaller than the initial timer value and larger than the second timer value b after stopping counting down the plurality of timer values (i.e., fourth step 208).

Figure 3:
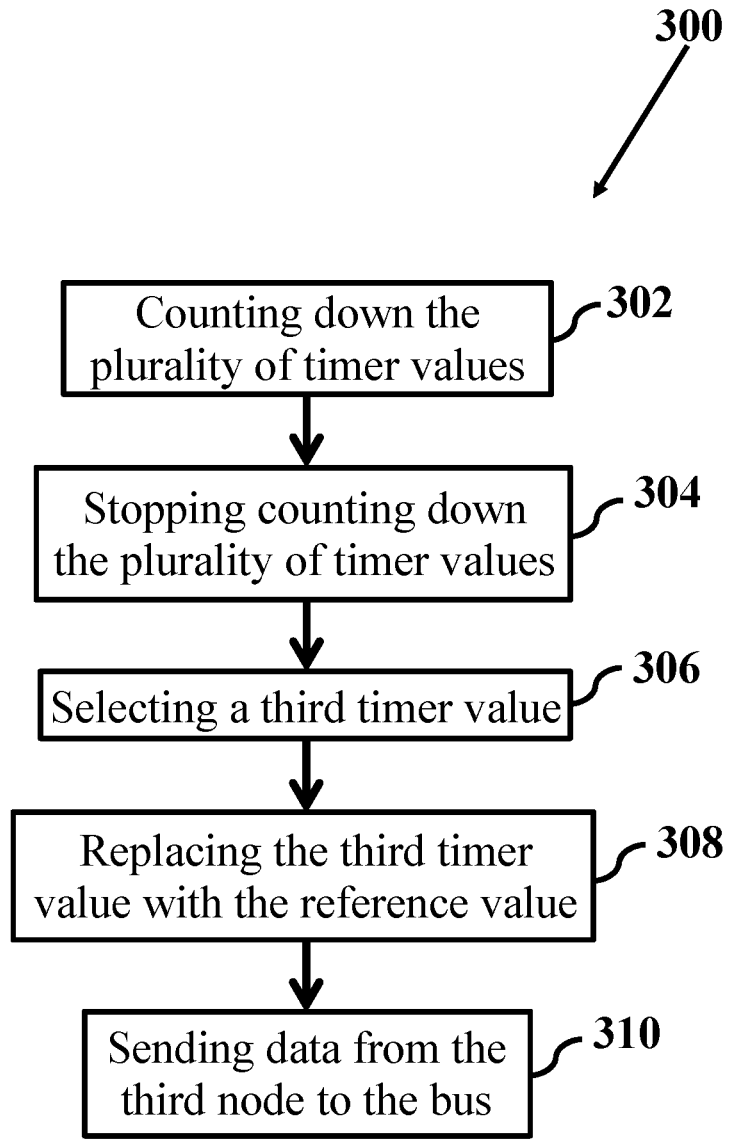
FIG. 3 is a flowchart of an iterative process according to one implementation of the present disclosure.

FIG. 3 is a flowchart of an iterative process 300 according to one implementation of the present disclosure. In some implementations, the method 200 may further include repeating the iterative process 300. The iterative process 300 may include counting down the plurality of timer values with the given rate by activating the plurality of timers in response to no data being loaded on the bus 104 (a first step 302), stopping counting down the plurality of timer values by stopping the plurality of timers in response to any of the plurality of timer values reaching zero (a second step 304), selecting a third timer value of the plurality of timer values (a third step 306), replacing the third timer value with the reference value (a fourth step 308), and sending data from the third node 110 to the bus 104. In some implementations, the third timer value may be equal to zero, and may be associated with a third timer of the plurality of timers. In different implementations, the third timer may be associated with the third node 110.

In an implementation, the method 200 may result in more efficient access of each of the plurality of nodes 102 to the bus 104. In different implementations, since a separate timer value may be assigned to each of the plurality of nodes 102, an unexpected disconnection (i.e., becoming inactive) of any of the plurality of nodes 102 from the distributed system 100 may have minor impact on the access time of other nodes to the bus 104. In addition, the mechanism of timer values and reference time selection may result in different timer values for different nodes. In some different implementations, the difference of timer values may prevent different nodes from simultaneously transferring data to the bus 104, and consequently, may prevent collision of data on the bus 104.

In some implementations, the method 200 may further include sending a $j^{th}$ token 112 of a plurality of tokens from an $i^{th}$ node 114 of the plurality of nodes 102 to a $j^{th}$ node 116 of the plurality of nodes and sending data from the $j^{th}$ node 116 to the bus 104 in response to the $j^{th}$ node 116 being active, where:

$1 \leq i \leq N$ is an integer number associated with the $i^{th}$ node 114, $1 \leq j \leq N$ is an integer number associated with the $j^{th}$ node 116, where $j \neq i$, and N is the number of the plurality of plurality of nodes 102. In some implementations, the activity of the $j^{th}$ node 116 may be determined by a response time of the $j^{th}$ node 116 to the $i^{th}$ node 114 after the $j^{th}$ token 112 is sent from the $i^{th}$ node 114 to the $j^{th}$ node 116. If the $j^{th}$ node 116 responds to the $i^{th}$ node 114 within a period of time shorter than a given threshold, the $j^{th}$ node 116 may be determined active. Otherwise, it may be determined not active.

In some implementations, the method 200 may further include sending a $(j+1)^{th}$ token of the plurality of tokens from the $i^{th}$ node 114 to a $(j+1)^{th}$ node of the plurality of nodes in response to the $j^{th}$ node not being active and j satisfying a set of conditions according to:

$j<N$, and
$j \neq i-1$.

In different implementations, the method 200 may further include sending a $(j+2)^{th}$ token of the plurality of tokens from the $i^{th}$ node to a $(j+2)^{th}$ node of the plurality of nodes in response to the $j^{th}$ node not being active and i and j satisfying a set of conditions according to:

$i \neq N$, and
$j = i-1$.

In an implementation, the method 200 may further include sending a first token 118 of the plurality of tokens from the $i^{th}$ node 114 to the first node 106 in response to the $j^{th}$ node not being active and i and j satisfying a set of conditions according to:

$i = N$, and
$j = i-1$.

In other word, when the $i^{th}$ node 114 coincides with an $N^{th}$ node 120, the first token 118 may be sent from the last node (i.e., the $N^{th}$ node 120) of the distributed system 100 to the first node 106.

In some implementations, the method 200 may further include sending the first token from the $i^{th}$ node 114 to the first node 106 in response to the $j^{th}$ node 116 not being active and i and j satisfying a set of conditions according to:

$i \neq 1$, and
$j = N$.

In some implementations, the method 200 may further include sending a second token 122 of the plurality of tokens from the $i^{th}$ node 114 to the second node 108 in response to the $j^{th}$ node 116 not being active and i and j satisfying a set of conditions according to:

$i = 1$, and
$j = N$.

Referring again to FIG. 1, in some implementations, the plurality of nodes 102 may include a $k^{th}$ node and an $l^{th}$ node, where $1 \leq k \leq N$ and $1 \leq l \leq N$ are an integer parameters where $k \neq j$ and $l \neq j$. The plurality of timer values may include a $k^{th}$ timer value and an $l^{th}$ timer value. The $k^{th}$ timer value may be assigned to a $k^{th}$ timer of the plurality of timers, and the $l^{th}$ timer value may be assigned to an $l^{th}$ timer of the plurality of timers. The $k^{th}$ timer may be associated with the $k^{th}$ node, and the $l^{th}$ timer may be associated with the $l^{th}$ node. In some implementations, the $k^{th}$ timer value may be the smallest timer value among the plurality of timer values, and the $l^{th}$ timer value may be the largest timer value among the plurality of timer values. In other implementations, the $k^{th}$ timer value and the $l^{th}$ timer value may satisfy a condition according to $b<2a$, where a is the $k^{th}$ timer value and b is the $l^{th}$ timer value. In other words, in some implementations, the largest timer value may be set smaller than twice the smallest timer value.

Figure 4:
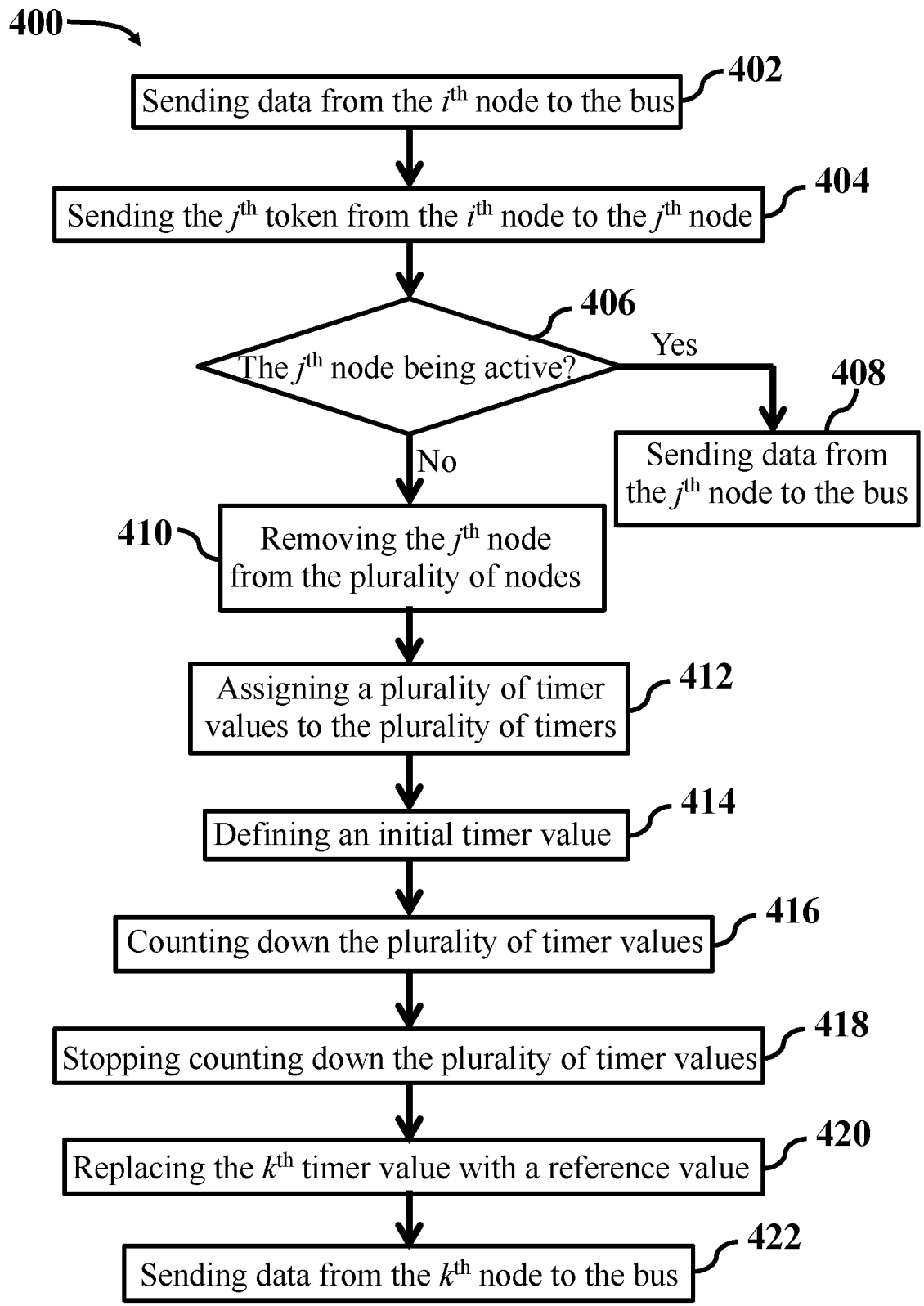
FIG. 4 is a flowchart of a method for controlling a distributed system according to one implementation of the present disclosure.

FIG. 4 is a flowchart of a method 400 for controlling the distributed system 100 according to one implementation of the present disclosure. In some implementations, the plurality of the method 400 may include sending data from the $i^{th}$ node 114 to the bus 104 (a first step 402), sending the $j^{th}$ token 112 from the $i^{th}$ node 114 to the $j^{th}$ node 116 (a second step 404), sending data from the $j^{th}$ node 116 to the bus 104 (a fourth step 406) in response to the $j^{th}$ node 116 being active (a third step 406, when 'yes'), removing the $j^{th}$ node 116 from the plurality of nodes (a fifth step 410) in response to the $j^{th}$ node 116 not being active (third step 406, when 'no), assigning a plurality of timer values to the plurality of timers (a sixth step 412), defining an initial timer value (a seventh step 414), counting down the plurality of timer values with a given rate by activating the plurality of timers (an eighth step 416), stopping counting down the plurality of timer values by stopping the plurality of timers in response to the $k^{th}$ timer value reaching zero (a ninth step 418), replacing the $k^{th}$ timer value with a reference value (a tenth step 420), and sending data from the $k^{th}$ node to the bus 104 (an eleventh step 422). In some implementations, the initial timer value may be equal to the $k^{th}$ timer value prior to counting down the plurality of timer values (i.e., eighth step 416). In other implementations, the reference value may be smaller than the initial timer value and larger than the $l^{th}$ timer value after stopping counting down the plurality of timer values (i.e., ninth step 418).

Referring again to FIG. 1, in some implementations, the plurality of nodes 102 may include an $m^{th}$ node, where $1 \leq m \leq N$ is an integer value and $m \neq j$. The plurality of timer values may include an $m^{th}$ timer value. The $m^{th}$ timer value may be associated with an $m^{th}$ timer of the plurality of timers. The $m^{th}$ timer may be associated with the $m^{th}$ node.

Figure 5:
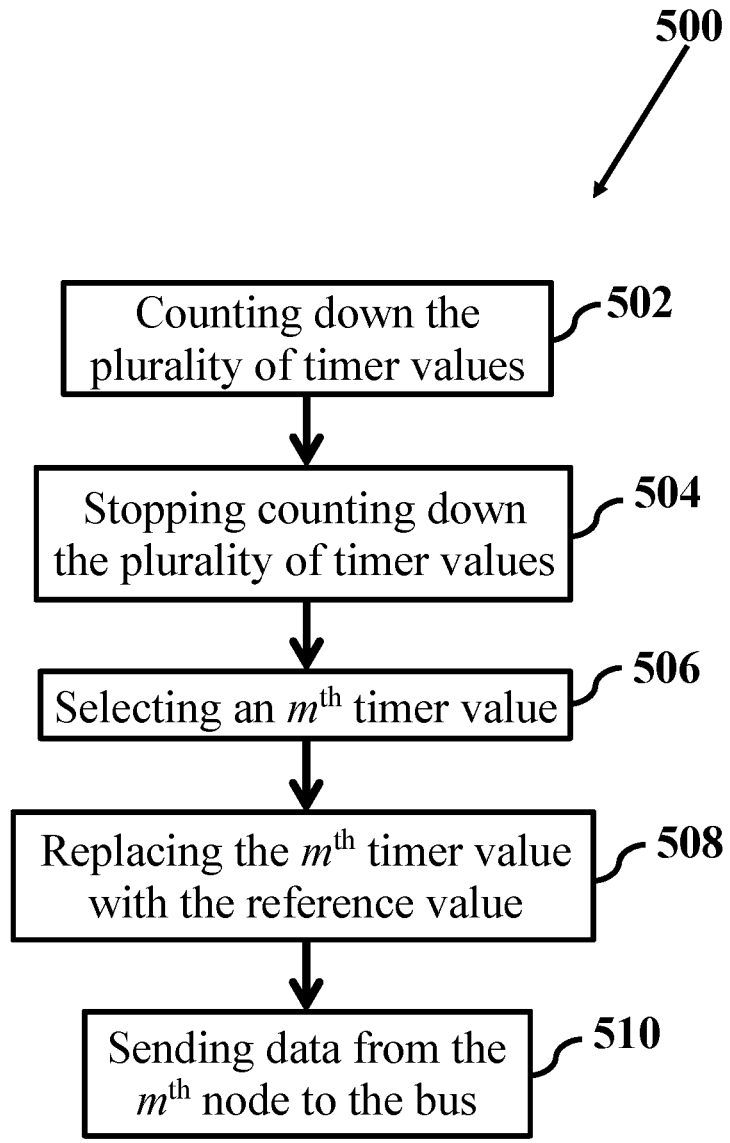
FIG. 5 is a flowchart of an iterative process according to one implementation of the present disclosure.

FIG. 5 is a flowchart of an iterative process 500 according to one implementation of the present disclosure. In some implementations, the method 400 may further include repeating the iterative process 500. The iterative process 500 may include counting down the plurality of timer values with the given rate by activating the plurality of timers in response to no data being loaded on the bus 104 (a first step 502), stopping counting down the plurality of timer values by stopping the plurality of timers in response to any of the plurality of timer values reaching zero (a second step 504), selecting the $m^{th}$ timer value (a third step 506), replacing the $m^{th}$ timer value with the reference value (a fourth step 508), and sending data from the $m^{th}$ node to the bus 104. In some implementations, the $m^{th}$ timer value may be equal to zero.

Figure 6:
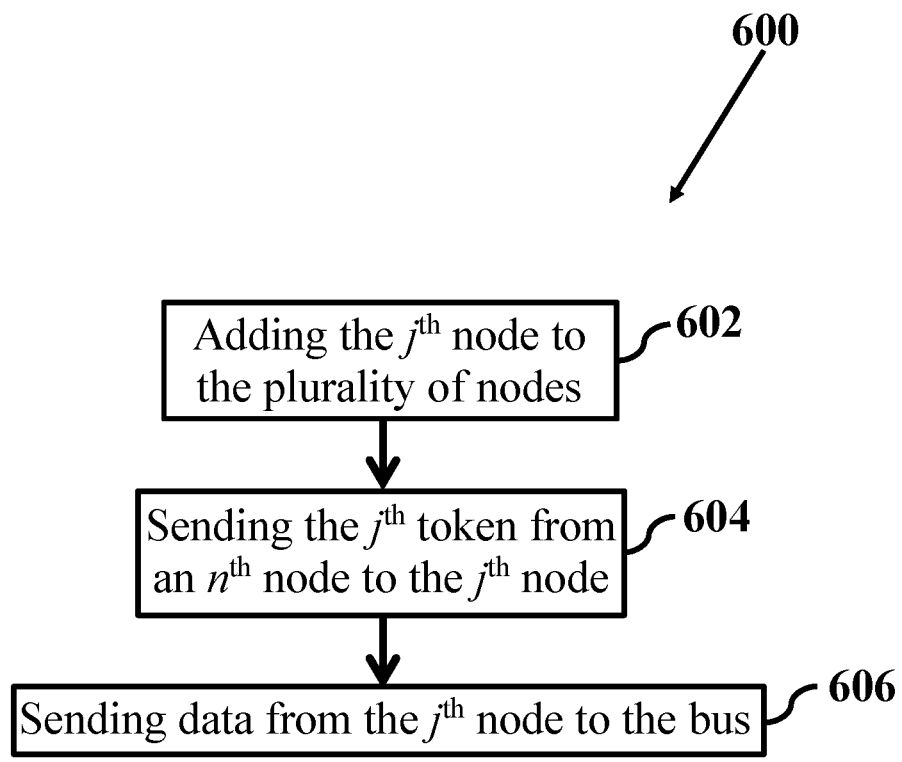
FIG. 6 is a flowchart of additional steps of a method for controlling a distributed system according to one implementation of the present disclosure.

FIG. 6 is a flowchart of additional steps of the method 400 according to one implementation of the present disclosure.

In some implementations, the method 400 may further include adding the $j^{th}$ node 116 to the plurality of nodes 102 in response to the $j^{th}$ node 116 becoming active after not being active (a first step 602), sending the $j^{th}$ token 112 from an $n^{th}$ node of the plurality of nodes to the $j^{th}$ node 116 (a second step 604), and sending data from the $j^{th}$ node 116 to the bus 104 (a third step 606), where $1 \leq n \leq N$ is an integer number associated with the $n^{th}$ node and $j \neq n$.

Example

Figure 7:
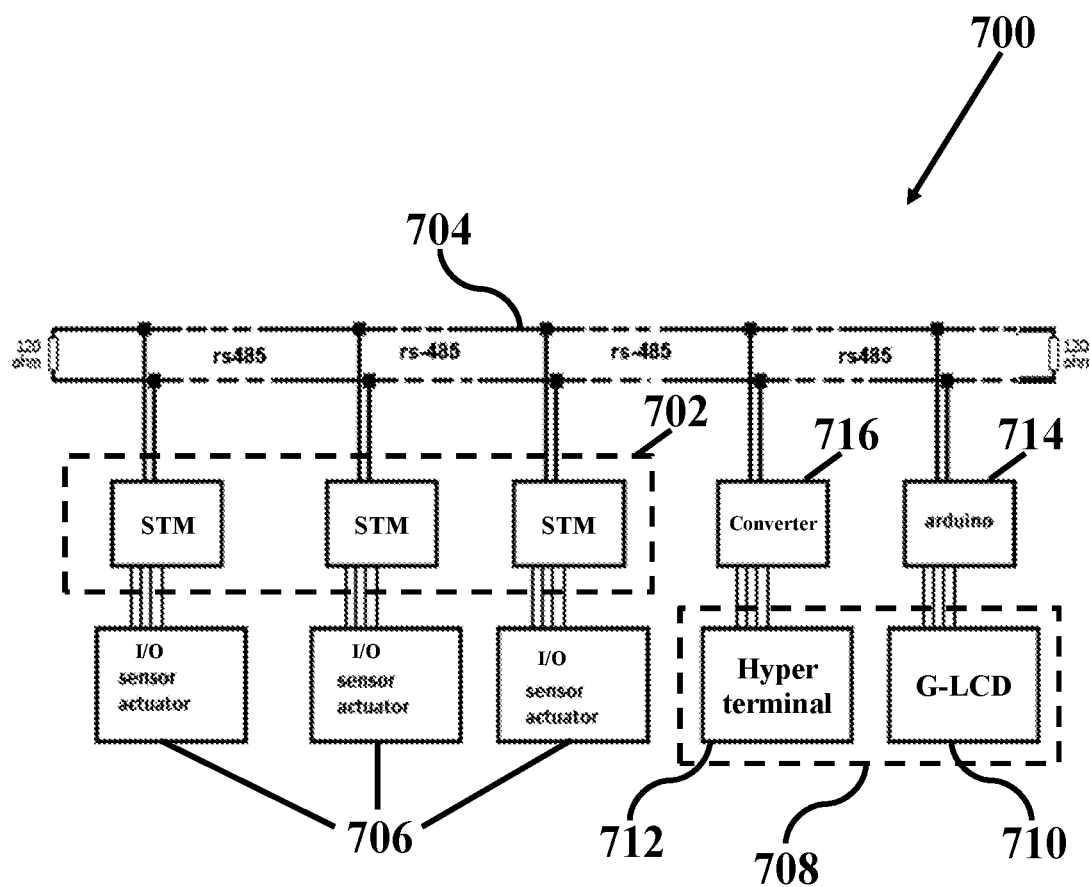
FIG. 7 is a schematic of an exemplary three-node distributed system according to one implementation of the present disclosure.

In this example, a hardware implementation of the distributed system 100 by using STM microcontrollers is demonstrated. FIG. 7 is a schematic of an exemplary three-node distributed system 700. Each node is implemented on an STM microcontroller. Therefore, the exemplary three-node distributed system 700 includes three STM microcontrollers 702. A timer is assigned for each node to count down the corresponding timer value. Each of the timers is implemented on the corresponding STM microcontroller. An RS485 interface 704 is used as an implementation of the bus 104. Input data is loaded into each of the nodes through a corresponding I/O sensor actuator. Three I/O sensor actuators 706 are implemented in the exemplary three-node distributed system 700. A network monitoring section 708 is also implemented through a graphic monitor (G-LCD) 710 and a hyper-terminal 712. The G-LCD 710 which is used for setting up an Arduino board graphic monitor 714. The RS485 interface 704 data is converted to numerical data by a converter 716 to be shown via the hyper-terminal 712.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for controlling a distributed system comprising a plurality of nodes, and a bus, the plurality of nodes associated with a plurality of timers, the method comprising:
assigning a plurality of timer values to the plurality of timers in response to no data being loaded on the bus, the plurality of timer values including a first timer value assigned to a first timer of the plurality of timers, and a second timer value assigned to a second timer of the plurality of timers, the first timer associated with a first node of the plurality of nodes and the second timer associated with a second node of the plurality of nodes, the first timer value being a smallest timer value among the plurality of timer values, and the second timer value being a largest timer value among the plurality of timer values, the first timer value and the second timer value satisfying a condition according to:
b<2a, where a is the first timer value and b is the second timer value;

defining an initial timer value, the initial timer value being equal to the first timer value;
counting down the plurality of timer values with a given rate by activating the plurality of timers;
stopping counting down the plurality of timer values by stopping the plurality of timers in response to the first timer value reaching zero;
replacing the first timer value with a reference value, the reference value being smaller than the initial timer value and being larger than the second timer value; and
sending data from the first node to the bus.

2. The method of claim 1, further comprising repeating an iterative process, the iterative process including:
counting down the plurality of timer values with the given rate by activating the plurality of timers in response to no data being loaded on the bus;
stopping counting down the plurality of timer values by stopping the plurality of timers in response to any of the plurality of timer values reaching zero;
selecting a third timer value of the plurality of timer values, the third timer value being equal to zero, the third timer value associated with a third timer of the plurality of timers, the third timer associated with a third node of the plurality of nodes;
replacing the third timer value with the reference value; and
sending data from the third node to the bus.

3. The method of claim 1, further comprising:
sending a $j^{th}$ token of a plurality of tokens from an $i^{th}$ node of the plurality of nodes to a $j^{th}$ node of the plurality of nodes, where $1 \leq i \leq N$ is an integer number associated with the $i^{th}$ node, $1 \leq j \leq N$ is an integer number associated with the $j^{th}$ node where $j \neq i$, and N is the number of the plurality of nodes; and
sending data from the $j^{th}$ node to the bus in response to the $j^{th}$ node being active.

4. The method of claim 3, further comprising sending a $(j+1)^{th}$ token of the plurality of tokens from the $i^{th}$ node to a $(j+1)^{th}$ node of the plurality of nodes in response to the $j^{th}$ node not being active and j satisfying a set of conditions according to $j<N$ and $j \neq i-1$.

5. The method of claim 3, further comprising sending a $(j+2)^{th}$ token of the plurality of tokens from the $i^{th}$ node to a $(j+2)^{th}$ node of the plurality of nodes in response to the $j^{th}$ node not being active and i and j satisfying a set of conditions according to $i \neq N$ and $j=i-1$.

6. The method of claim 3, further comprising sending a first token of the plurality of tokens from the $i^{th}$ node to the first node in response to the $j^{th}$ node not being active and i and j satisfying a set of conditions according to i=N and j=i-1.

7. The method of claim 3, further comprising sending a first token of the plurality of tokens from the $i^{th}$ node to the first node in response to the $j^{th}$ node not being active and i and j satisfying a set of conditions according to $i \neq 1$ and j=N.

8. The method of claim 3, further comprising sending a second token of the plurality of tokens from the $i^{th}$ node to the second node in response to the $j^{th}$ node not being active and i and j satisfying a set of conditions according to i=1 and j=N.

9. A method for controlling a distributed system comprising a plurality of nodes and a bus, the plurality of nodes associated with a plurality of timers, the method comprising:
sending data from an $i^{th}$ node of the plurality of nodes to the bus;
sending a $j^{th}$ token of a plurality of tokens from the $i^{th}$ node to a $j^{th}$ node of the plurality of nodes, where $1 \leq i \leq N$ is an integer number associated with the $i^{th}$ node, $1 \leq j \leq N$ is an integer number associated with the $j^{th}$ node where $j \neq i$, and N is the number of the plurality of nodes;
sending data from the $j^{th}$ node to the bus in response to the $j^{th}$ node being active;
removing the $j^{th}$ node from the plurality of nodes in response to the $j^{th}$ node not being active;
assigning a plurality of timer values to the plurality of timers, the plurality of timer values including a $k^{th}$ timer value assigned to a $k^{th}$ timer of the plurality of timers, and an $l^{th}$ timer value assigned to an $l^{th}$ timer of the plurality of timers, the $k^{th}$ timer associated with a $k^{th}$ node of the plurality of nodes and the $l^{th}$ timer associated with an $l^{th}$ node of the plurality of nodes, where $1 \leq k \leq N$ and $1 \leq l \leq N$ are integer parameters where $k \neq j$ and $l \neq j$, the $k^{th}$ timer value being a smallest timer value among the plurality of timer values, and the $l^{th}$ timer value being a largest timer value among the plurality of timer values, the $k^{th}$ timer value and the $l^{th}$ timer value satisfying a condition according to:
b<2a, where a is the $k^{th}$ timer value and b is the $l^{th}$ timer value;
defining an initial timer value, the initial timer value being equal to the $k^{th}$ timer value;
counting down the plurality of timer values with a given rate by activating the plurality of timers;
stopping counting down the plurality of timer values by stopping the plurality of timers in response to the $k^{th}$ timer value reaching zero;
replacing the $k^{th}$ timer value with a reference value, the reference value being smaller than the initial timer value and being larger than the $l^{th}$ timer value; and
sending data from the $k^{th}$ node to the bus.

10. The method of claim 9, further comprising repeating an iterative process, the iterative process including:
counting down the plurality of timer values with the given rate by activating the plurality of timers in response to no data being loaded on the bus;
stopping counting down the plurality of timer values by stopping the plurality of timers in response to any of the plurality of timer values reaching zero;
selecting an $m^{th}$ timer value of the plurality of timer values, the $m^{th}$ timer value being equal to zero, the $m^{th}$ timer value associated with an $m^{th}$ timer of the plurality of timers, the $m^{th}$ timer associated with an $m^{th}$ node of the plurality of nodes, where m is an integer value and $m \neq j$;
replacing the $m^{th}$ timer value with the reference value; and
sending data from the $m^{th}$ node to the bus.

11. The method of claim 10, further comprising:
adding the $j^{th}$ node to the plurality of nodes in response to the $j^{th}$ node becoming active after not being active;
sending the $j^{th}$ token from an $n^{th}$ node of the plurality of nodes to the $j^{th}$ node, where $1 \leq n \leq N$ is an integer number associated with the $n^{th}$ node, and $j \neq n$; and
sending data from the $j^{th}$ node to the bus.

12. A distributed system comprising a plurality of nodes and a bus, the plurality of nodes associated with a plurality of timers, the distributed system configured to:
responsive to no data being loaded on the bus, assign a plurality of timer values to the plurality of timers, the plurality of timer values including a first timer value assigned to a first timer of the plurality of timers, and a second timer value assigned to a second timer of the plurality of timers, the first timer associated with a first node of the plurality of nodes and the second timer associated with a second node of the plurality of nodes, the first timer value being a smallest timer value among the plurality of timer values, and the second timer value being a largest timer value among the plurality of timer values, the first timer value and the second timer value satisfying a condition according to:
b<2a, where a is the first timer value and b is the second timer value;
define an initial timer value, the initial timer value being equal to the first timer value;
count down the plurality of timer values with a given rate by activating the plurality of timers;
stop counting down the plurality of timer values by stopping the plurality of timers responsive to the first timer value reaching zero;
replace the first timer value with a reference value, the reference value being smaller than the initial timer value and being larger than the second timer value; and
send data from the first node to the bus.

13. The distributed system of claim 12, further configured to:
send a $j^{th}$ token of a plurality of tokens from an $i^{th}$ node of the plurality of nodes to a $j^{th}$ node of the plurality of nodes, where $1 \le i \le N$ is an integer number associated with the $i^{th}$ node, $1 \le j \le N$ is an integer number associated with the $j^{th}$ node where $j \ne i$, and N is the number of the plurality of nodes; and
send data from the $j^{th}$ node to the bus in response to the $j^{th}$ node being active.

14. The distributed system of claim 13, further configured to send a $(j+1)^{th}$ token of the plurality of tokens from the $i^{th}$ node to a $(j+1)^{th}$ node of the plurality of nodes in response to the $j^{th}$ node not being active and j satisfying a set of conditions according to j<N and $j \ne i-1$.

15. The distributed system of claim 13, further configured to send a $(j+2)^{th}$ token of the plurality of tokens from the $i^{th}$ node to a $(j+2)^{th}$ node of the plurality of nodes in response to the $j^{th}$ node not being active and i and j satisfying a set of conditions according to $i \ne N$ and $j=i-1$.

16. The distributed system of claim 13, further configured to send a first token of the plurality of tokens from the $i^{th}$ node to the first node in response to the $j^{th}$ node not being active and i and j satisfying a set of conditions according to $i=N$ and $j=i-1$.

17. The distributed system of claim 13, further configured to send a first token of the plurality of tokens from the $i^{th}$ node to the first node in response to the $j^{th}$ node not being active and i and j satisfying a set of conditions according to $i \ne 1$ and $j=N$.

18. The distributed system of claim 13, further configured to send a second token of the plurality of tokens from the $i^{th}$ node to the second node in response to the $j^{th}$ node not being active and i and j satisfying a set of conditions according to $i=1$ and $j=N$.

* * * * *